W. E. A. PIPHER.
DUST PAN.
APPLICATION FILED APR. 20, 1912.
1,138,504.  Patented May 4, 1915.
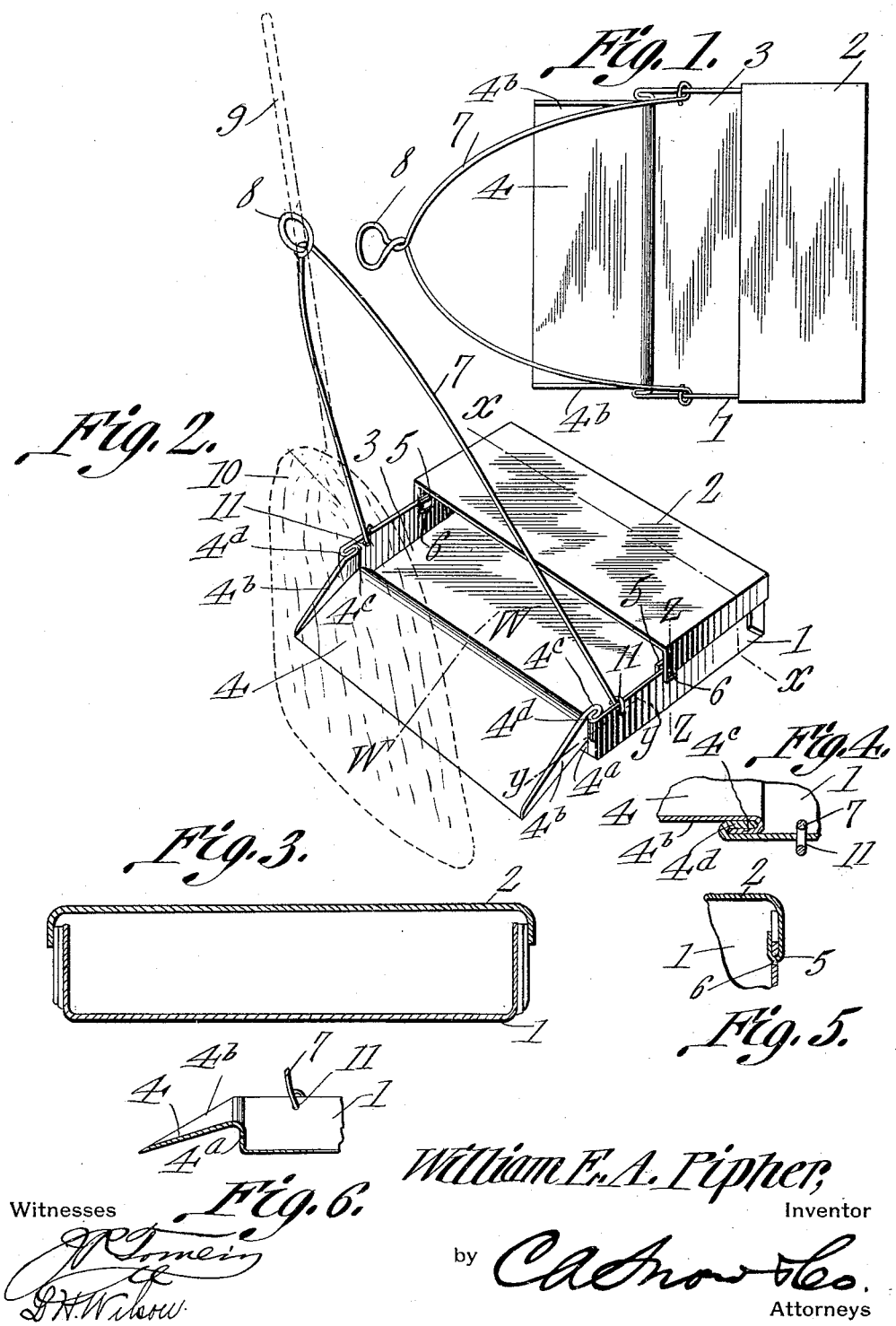
William E. A. Pipher,
Inventor
Witnesses
by C. A. Snow & Co.
Attorneys

UNITED STATES PATENT OFFICE.

WILLIAM E. A. PIPHER, OF PARKERS LANDING, PENNSYLVANIA, ASSIGNOR OF ONE-FOURTH TO CHARLES A. SHERWOOD, OF PARKERS LANDING, PENNSYLVANIA.

DUST-PAN.

1,138,504. Specification of Letters Patent. Patented May 4, 1915.

Application filed April 20, 1912. Serial No. 692,173.

*To all whom it may concern:*

Be it known that I, WILLIAM E. A. PIPHER, a citizen of the United States, residing at Parkers Landing, in the county of Armstrong and State of Pennsylvania, have invented a new and useful Dust-Pan, of which the following is a specification.

The present invention appertains to dust pans, and aims to provide a novel or unique article of manufacture of the nature indicated, which shall be capable of inexpensive and convenient manufacture.

In the accompanying drawing, Figure 1 is a plan view of the invention; Fig. 2 is a perspective view of the same; Fig. 3 is a transverse section thereof taken on the line $x$—$x$ of Fig. 2. Figs. 4 and 5 are sections taken on the line $y$—$y$ and $z$—$z$ of Fig. 2, respectively; Fig. 6 is a section taken on the line $w$—$w$ of Fig. 2.

In carrying out the present invention, there is provided a suitable receptacle or dust-pan proper 1, which includes a rectangular bottom and upstanding sides, as well as a back. The back is provided with an extension 2 which is bent over the bottom and sides to form a hood at the rear portion of the pan to receive the sweepings. The hood 2 terminates short of the front of the pan, to provide an opening 3 for receiving the sweepings. To maintain the hood 2 in position, the same is provided with depending sides overlapping the sides of the pan, the sides of the hood having tongues 5 struck inwardly through slots or apertures 6 in the sides of the pan, whereby the hood will be rigidly secured in position without the employment of solder or the like.

The salient feature of the present invention resides in the formation of the forward end portion of the pan. To this end, the bottom of the pan is provided with a forwardly projecting integral extension, which extension is provided with upstanding side flanges $4^b$. The basal portion of the extension has a double bend, as clearly seen in Fig. 6, which forms an upstanding portion $4^a$ between the forward ends of and less in height than the sides of the pan, and a lip 4 declined from the said upstanding portion $4^a$. The said double bend serves to bring the flanges $4^b$ and the sides of the pan together, and the forward ends of the sides and rear ends of the said flanges are interlocked, as at $4^c$. Thus, the forward ends of the sides have bent back portions, and the rear ends of the flanges have bent portions interlocked with the aforesaid bent back portions, whereby the side flanges $4^b$ of the lip 4 are rigidly and detachably engaged to the sides of the pan. Thus the lip may be provided for the pan, by a peculiar method which will be found of advantage in the manufacture of the present device. Attention is directed to the fact that the double bend provides the upstanding portion $4^a$ for catching the sweepings in back of the lip, and also serves to cause the flanges $4^b$ and the sides of the pan to overlap, in order that the overlapped portions may be attached. The overlapped portions of the flanges and sides being attached, will serve to brace the lip in position, as will be apparent, the upstanding portion properly supporting the lip above the forward end of the pan bottom.

A bail or handle 7, of suitable stout wire, is provided for the pan or receptacle 1, the intermediate portion of said bail or handle being formed into a loop 8 adapted to receive the handle 9 of the broom 10. The ends of the bail 7 are received by apertures 11 in the sides of the receptacle or pan 1 adjoining the forward ends of the sides, said lower ends of said bail being looped therethrough and caused to rest upon the top edges of the sides. Thus, when the broom handle 9 is passed through the loop 8, the broom may be employed in the ordinary fashion for sweeping purposes, the sweeping being readily swept over the lip 4 into the pan.

What is claimed is:—

As an article of manufacture, a sheet metal pan including a bottom and sides, the bottom having a forwardly projecting extension provided with upstanding side flanges, the basal portion of the said extension having a double bend forming an upstanding portion between the forward ends of and less in height than the sides of the pan, and a lip declined from the said upstanding portion, the forward ends of the side having bent back portions and the rear ends of the flanges having bent back portions interlocked with the aforesaid bent back portions.

In testimony that I claim the foregoing as my own, I have hereto affixed my signature in the presence of two witnesses.

WILLIAM E. A. PIPHER.

Witnesses:
E. M. VOGEL,
H. C. ELDER.